US012197114B2

United States Patent
Ueda et al.

(10) Patent No.: US 12,197,114 B2
(45) Date of Patent: Jan. 14, 2025

(54) PROJECTOR, TEMPERATURE CONTROL METHOD OF PROJECTOR, AND STORAGE MEDIUM

(71) Applicant: CASIO COMPUTER CO., LTD., Tokyo (JP)

(72) Inventors: Tomoyuki Ueda, Hamura (JP); Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 509 days.

(21) Appl. No.: 17/518,460

(22) Filed: Nov. 3, 2021

(65) Prior Publication Data
US 2022/0171262 A1    Jun. 2, 2022

(30) Foreign Application Priority Data

Dec. 2, 2020   (JP) ................................ 2020-200266
Apr. 23, 2021   (JP) ................................ 2021-073247

(51) Int. Cl.
*G03B 21/16*     (2006.01)
*G01K 7/22*     (2006.01)
*G03B 21/20*     (2006.01)

(52) U.S. Cl.
CPC .............. *G03B 21/16* (2013.01); *G01K 7/22* (2013.01); *G03B 21/2033* (2013.01)

(58) Field of Classification Search
CPC .. G03B 21/16; G03B 21/2033; G03B 21/206; G01K 7/22
See application file for complete search history.

(56) References Cited

U.S. PATENT DOCUMENTS

| 10,884,327 B2 | 1/2021 | Noda | |
|---|---|---|---|
| 2008/0165815 A1* | 7/2008 | Kamijima | H01S 5/14 372/34 |
| 2014/0253527 A1* | 9/2014 | Ogi | G09G 3/025 345/207 |
| 2015/0022568 A1* | 1/2015 | Ishii | H04N 9/3161 345/697 |
| 2020/0133108 A1* | 4/2020 | Noda | G05D 23/1932 |
| 2020/0404230 A1* | 12/2020 | Fujita | H04N 9/3161 |

FOREIGN PATENT DOCUMENTS

| CN | 107942855 A | 4/2018 |
|---|---|---|
| JP | 2019128528 A | 8/2019 |

OTHER PUBLICATIONS

Chinese Office Action (and an English language translation thereof) dated Apr. 15, 2023, issued in counterpart Chinese Application No. 202111457528.

* cited by examiner

*Primary Examiner* — Magda Cruz
(74) *Attorney, Agent, or Firm* — Holtz, Holtz & Volek PC

(57) ABSTRACT

A projector is configured to, in response to a temperature detection value acquired from one or more temperature detection sensors that detect a temperature of a light source unit reaching a set value, reduce a current ratio flowing through the light source unit; and in response to the reduced current ratio falling below a first set ratio, execute a first process.

13 Claims, 6 Drawing Sheets

PROJECTOR, TEMPERATURE CONTROL METHOD OF PROJECTOR, AND STORAGE MEDIUM

BACKGROUND OF THE INVENTION

1. Field of the Invention

The present invention relates to a projector configured to control a current of a light source and conduct warning display or error stopping on the temperature of components other than the light source based on temperature data obtained from a temperature sensor, and relates to a temperature control method and a program.

2. Description of the Related Art

Conventionally, techniques for projectors have been known for controlling the temperatures of a plurality of semiconductor light-emitting devices to he constant so that the brightness of the light source does not change significantly even when the amount of heat generated differs among these semiconductor light-emitting elements. JP 2019-128528 discloses the technique of suppressing the brightness of light emitted from the light source co the maximum by current control (for example, the current ratio flowing through the light source is controlled to 60%), followed by warning display or error stop executed when the value obtained from the temperature sensor reaches a set value.

SUMMARY OF THE INVENTION

A projector according to one aspect of the present invention is configured to, in response to a temperature detection value acquired from one or more temperature detection sensors that detect a temperature of a light source unit reaching a set value, control to reduce a current flowing through the light source unit; and in response co a current ratio for a current flowing through the light source unit before a start of the controlling reaching a first set ratio, or in response to a reduced current value reaching a first threshold, execute a first process.

DETAILED DESCRIPTION OF THE INVENTION

Figure 1:
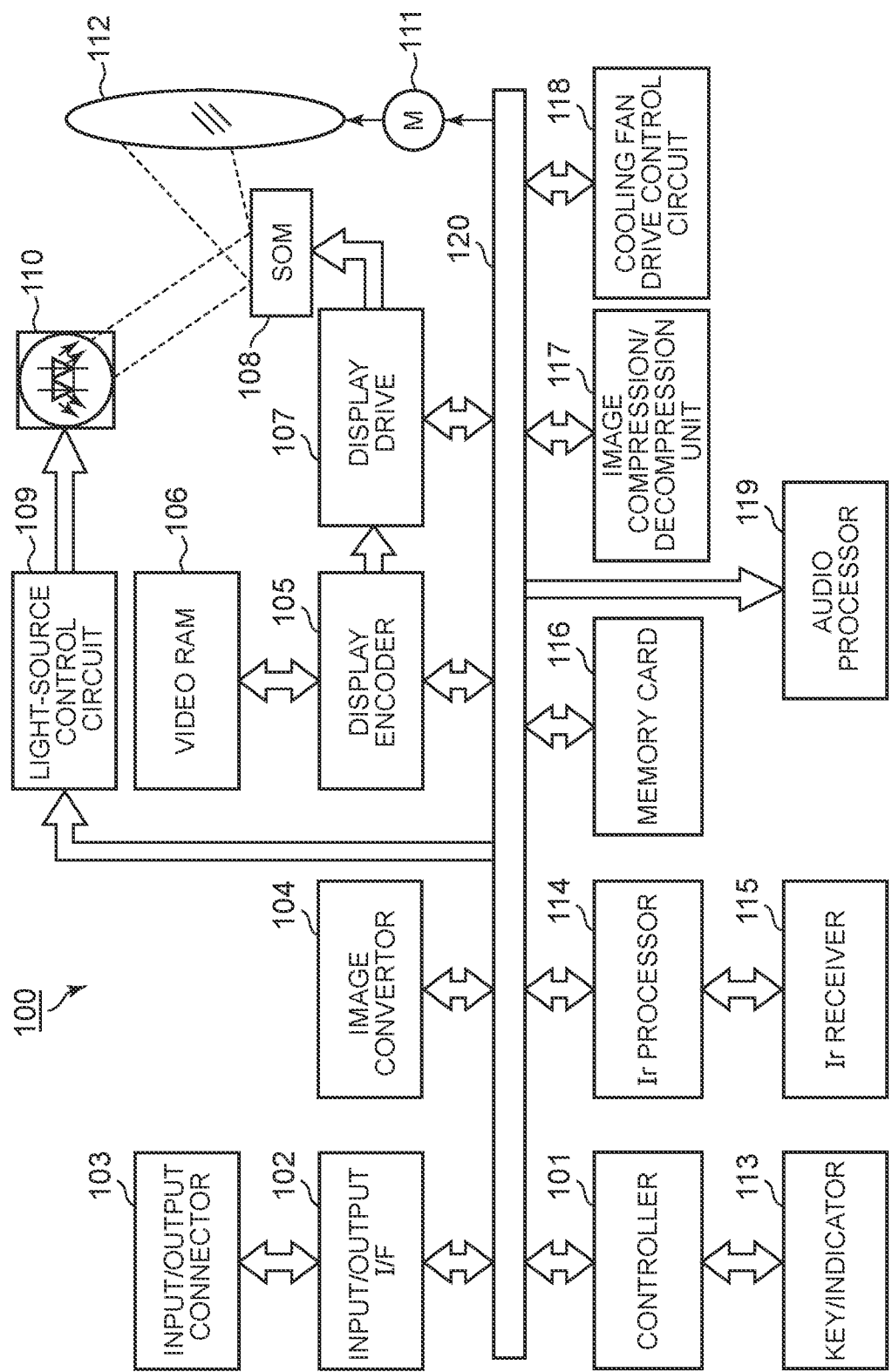
FIG. 1 is a block diagram of a projector according to one embodiment of the present invention.

Referring to the drawings, the following describes embodiments of the present invention in details. FIG. 1 is a block diagram of a projector 100 according to one embodiment of the present invention. In the projector 100, a controller 101, an input/output interface (I/F) 102, an image convertor 104, a display encoder 105, a display drive 107, a light-source control circuit 109, a lens motor 111, an Ir processor 114, a memory card 116, an image compression/decompression unit 117 a cooling fan drive control circuit 118, and an audio processor 119 are each connected to a system bus 120. The input/output I/F 102 is connected to an input/output connector 103. A key/indicator 113 is connected. to the controller 101. A video random access memory (RAM) 106 is connected so the display encoder 105. The display encoder 105 is connected to the display drive 107. The display drive 107 drives a display element 108, which is a spatial optical modulator (SOM). The light-source control circuit 109 controls a light source unit 110. The lens motor 111 operates a movable lens group 112.

Figure 2:
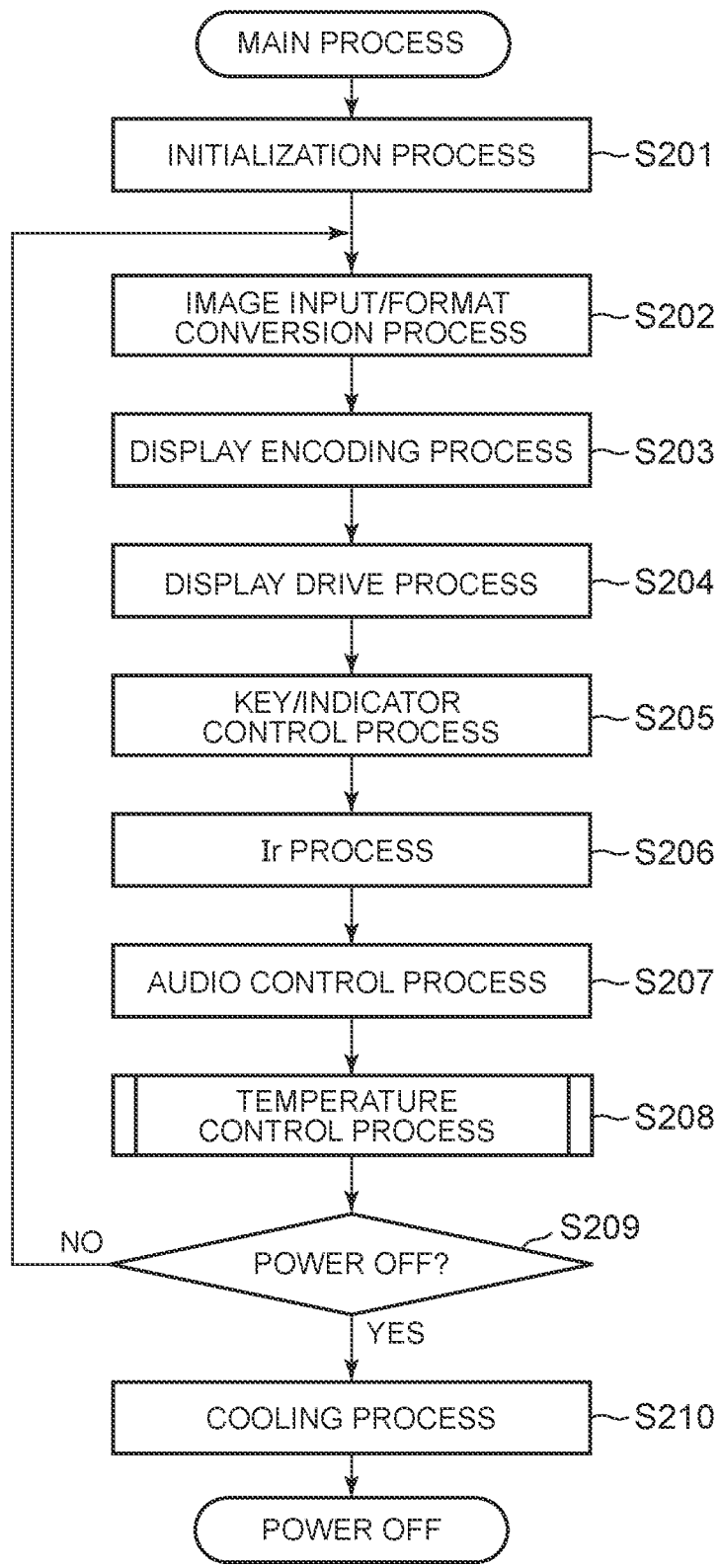
FIG. 2 is a flowchart illustrating an example of the main processing according to one embodiment of the present invention.

FIG. 2 is a flowchart illustrating the main processing executed by the controller 101 of FIG. 1. This process is an operation by at least one processor (not illustrated) in the controller 101 executing a main process program stored in the memory.

First, the processor of the controller 101 (hereinafter, simply referred to as "controller 101") executes an initialization process such as initialization of a memory (not illustrated) (step S201). After that, the controller 101 repeatedly executes a series of processes from steps S202 to S208 described below.

In this series of repetitive processes, the controller 101 first executes an image input format conversion process (step S202). In this process, the controller 101 sends image signals of various standards from the input/output connector 103 to the image convertor 104 via the input/output I/F 102 and the system bus 120, and causes the image convertor 104 to convert the image signals to unify them into a predetermined format suitable for display and transfer the converted data to the display encoder 105 via the system bus 120.

Next, the controller 101 executes a display encoding process (step S203). In this process, the controller 101 causes the display encoder 105 to expand and store the image signals received from the image convertor 104 in the video RAM 106, and then generate video signals from the stored contents in the video RAM 106 and output them to the display drive 101.

Next, the controller 101 executes a display drive process (step S204). In this process, the controller 101 causes the display drive 107 to drive the display element 108, which is a spatial optical modulator (SOM), at an appropriate frame rate corresponding to the image signals output from the display encoder 105. The controller 101 also controls the light-source control circuit 109. The light-source control circuit 109 properly controls the operation of the excitation-light irradiation unit of the light source unit 110 so that light in a predetermined wavelength band required at the time of image generation is emitted from the light source unit 110. As a result, the light beam flux emitted from the light source unit 110 enters the display element 108 driven by the display drive 107 through a guiding optical system to form an optical image with the reflected light from the display element 108, and the image is projected for display on the screen, which is not illustrated, through a projection optical system of the movable lens group 112. At this time, the movable lens group 112 is driven for zoom and focus adjustment by the lens motor 111, which is controlled by the controller 101 via the system bus 120.

Although details are omitted, components such as a blue laser diode, a red light emitting diode, a fluorescent wheel, and a color wheel in the light source unit 110, which are not illustrated, are controlled by the controller 101, and the light in each wavelength band is controlled in a time-division manner.

Next, the controller 101 executes a key/indicator control process (step S205). In this process, the controller 101 controls the key/indicator 113. The key/indicator 113 includes main keys and indicators placed in a chassis, not illustrated, of the projector 100. Signals based on the operation with the key/indicator 113 are input to the controller 101 for processing. The controller 101 also controls each of the indicators of the key/indicator 113 for lighting.

Next, the controller 101 executes an Ir process (step S206). In this process, the controller 101 causes an Ir receiver 115 to receive a key operation signal from a remote controller, not illustrated, and causes the Ir processor 114 to demodulate the key operation signal into a code signal. The obtained demodulation signal is input to the controller 101 for processing.

Next, the controller 101 executes an audio control process (step S207). In this process, the controller 101 causes the audio processor 119 via the system bus 120 to generate audio data to be issued together with the image projected on the screen. The audio processor 119 includes a sound source circuit such as a pulse code modulation (PCM) sound source. In the projection mode and the playback mode, the audio processor 119 causes a digital/analog (D/A) converter, not illustrated, to convert the audio data generated by the PCM sound source circuit into an analog data, and drives a speaker, not illustrated, to amplify and issue the sound.

Next, the controller 101 executers a temperature control process (step S208). In this process, the controller 101 causes LD thermistors, which are a plurality of temperature sensors, placed in the light source unit 110, for example, to detect temperatures. Then, the controller 101 causes the light-source control circuit 109 to execute a current control process of the light source unit 110 based on the result of the temperature detection, and also to execute the determination about warning display of the temperature and error stopping. The details of this process are described later. The controller 101 also causes the cooling fan drive control circuit 118 to control the rotation speed of a cooling fan, not illustrated, based on the result of the temperature detection.

Finally, the controller 101 determines whether or not the user turns the power off with the key/indicator 113 (step S209). If the result of this determination is NO, the procedure returns to step S202, and the controller 101 repeatedly executes the series of processes from step S202 to S209 described above.

When the user turns the power off and the determination in step S209 is YES, then the controller 101 executes a timer processing to cause the cooling fan drive control circuit 118 to continue rotating the cooling fan for a certain period of time (after the cooling process in step S210), followed by turning off the power of the main body.

Although not illustrated, when the user inserts a memory card 116, which is a removable recording medium into the memory slot of the main body, not illustrated, the controller 101 executes a recording process that causes the image compression/decompression unit 111 to compress the brightness signal and the color-difference signal of the image signals by processing such as ADCT and Huffman coding, and then sequentially write them to the memory card 116. In the playback mode, the controller 101 causes the image compression/decompression unit 117 to read out the image data recorded in the memory card 116, decompress each piece of image data making up a series of moving images in the units of frames, and output the data to the display encoder 105 via the image convertor 104. In this way, the image compression/decompression unit 117 is capable of executing a playback process of moving images, for example, based on the image data stored in the memory card 116.

Figure 3:
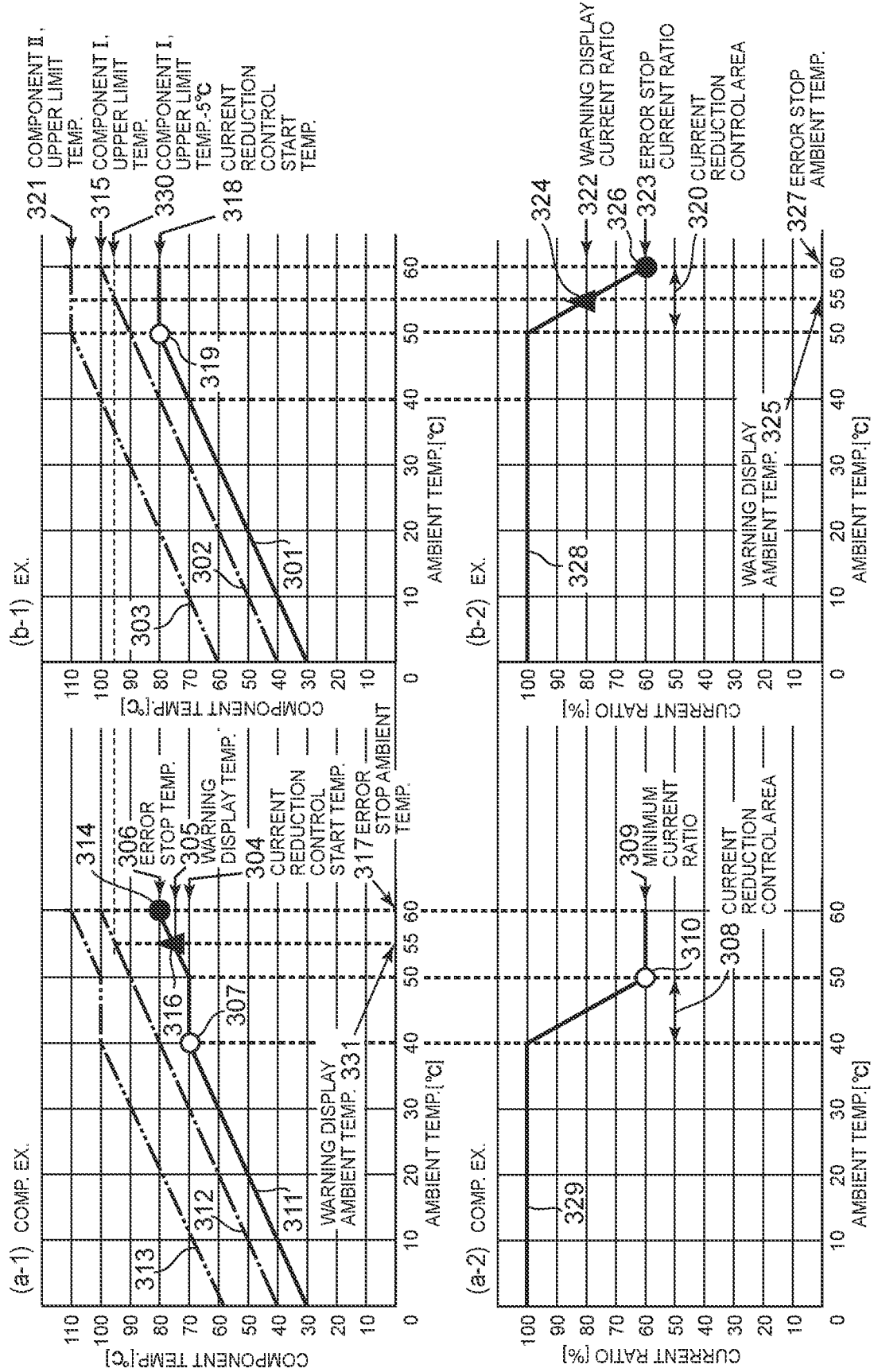
FIG. 3 describes one embodiment.

FIG. 3 describes the present embodiment. In general, projectors are configured to, if the ambient temperature, which is the temperature of the surrounding of the projector (such as the operating area in a room or in a factory), becomes high and the electronic components in the projector reach a high temperature, suppress the current fed to the light source unit and thus reduce the brightness of the light source to protect these electronic components.

FIG. 3(*b*-1) is a. graph illustrating an example of the temperature characteristics 301, 302, and 303 of the present embodiment. The temperature characteristic 301 indicated with the solid line is an example of temperature detection values (components temperature: vertical axis) detected by a LD thermistor (not illustrated) placed near the light source unit 110 in FIG. 1 at a certain ambient. temperature (horizontal axis). This temperature characteristic 301 is the temperature detection values as they are that are output from the LD thermistor placed near the laser diode light source to detect the temperature of this light source. When a plurality of LD thermistors is placed, the maximum value or the average of the plurality of outputs is set as the temperature detection value, for example.

The temperature characteristic 302 indicated with the alternate long and short dash line is estimated values of the temperature characteristic of each electronic circuit illustrated in FIG. 1 other than the light source unit 110 and the light-source control circuit 109 in FIG. 1. This temperature characteristic 302 is estimated as follows: during development of the projector, a thermocouple is attached to each electronic circuit, and the temperature of this thermocouple is measured experimentally. From this, the temperature characteristic 302 is estimated as a correlation characteristic to the temperature characteristic 301 of the LD thermistor. Hereinafter, these electronic circuits are collectively referred to as components that are required for temperature observation or temperature observation component I.

The temperature characteristic 303 indicated with the alternate long and two short dashes line is estimated values of the temperature characteristic of the light source unit 110 and the light-source control circuit 109 in FIG. 1, which are to be controlled in the present embodiment. Similarly to the case of the temperature characteristic 302, this temperature characteristic 303 is estimated as follows: a thermocouple is attached to each of the light source unit 110 and the light-source control circuit 109 during development of the projectors and the temperature of this thermocouple is measured experimentally. From this, the temperature characteristic 303 is estimated as a correlation characteristic to the temperature characteristic 301 of the LD thermistor. These electronic circuits are collectively referred to as a temperature observation component II.

FIG. 3(*b*-2) is a graph illustrating an example of the current control characteristic 323 in the light-source control circuit 109 of the present. embodiment. This characteristic assumes the current value when the light-source control circuit 109 fully operates the light source unit 110 as 100%, and plots the current ratio (vertical axis) to control the ratio of current to 100%, versus ambient temperatures on the horizontal axis. More specifically, the current ratio in the present disclosure indicates the ratio between the current flowing through the light source unit 110 before the temperature detection value detected by the temperature sensor exceeds the set value, and the reduced current flowing through the light source unit 110 under the current control described above.

FIG. 3(*a*-1) is illustrated as a comparison example, and is a graph illustrating an example of the temperature characteristics 311, 312, and. 313 under a general temperature control. The temperature characteristic 311 indicated with the solid line, the temperature characteristic 312 indicated with the alternate long and short dash line, and the temperature characteristic 313 indicated with the alternate long and two short dashes line correspond to the temperature characteristics 301, 302, and 303 in the present embodiment illustrated in FIG. 3(*b*-1), respectively. They are measured. in the same way.

The example of the current control characteristic 329 in FIG. 3(*a*-2) with the ambient temperature (horizontal axis) versus the current ratio (vertical axis) also corresponds to the example of the current control characteristic 328 of FIG. 3(*b*-2) in the present embodiment.

In FIG. 3, the ambient temperature is measured by preparing for temperature setting in a constant-temperature constant-humidity chamber, for example, and placing the projector in the chamber.

Prior to the description on the temperature control example of the present. embodiment in FIG. 3(*b*-1) and FIG. 3(*b*-2), the following describes an example of the temperature control. in FIG. 3(*a*-1) and FIG. 3(*a*-2) for comparison. Hereinafter, the example of FIG. 3(*a*-1) and FIG. 3(*a*-2) is referred to as a comparative example, and the example of FIG. 3(*b*-1) and FIG. 3(*b*-2) is referred to as an example of the present embodiment.

In the comparative example, temperature is controlled by comparing the temperature detection values detected by the LD thermistor with three temperature thresholds: a current. reduction control start temperature (or current control temperature) 304; a warning display temperature 305; and an error stop temperature 306. In the graph of FIG. 3(*a*-1), as the ambient temperature increases to 40 degrees (shifts to the right. on the horizontal axis), the temperature rises linearly in the temperature characteristic 311 of the temperature detection values detected by the LD thermistor. In conjunction with this, it is estimated that the temperature of the temperature characteristic 312 of the temperature observation component also increase linearly. It is also estimated that in conjunction with this, the temperature of the temperature characteristic 313 of the temperature observation component II also increase linearly.

As the ambient temperature rises, the temperature detection value by the LD thermistor reaches the current reduction control start temperature (e.g., component temperature=70° C. in FIG. 3(*a*-1)) (plot "○" 307 in FIG. 3(*a*-1)). Then, current control starts for the light-source control circuit. Specifically, in the graph of FIG. 3(*a*-2), the current control is conducted so that, starting from the ambient temperature at 307 when the temperature detection value by the LD thermistor reaches the current reduction control start temperature 304 (for example, the ambient temperature=40 degrees in FIG. 3(*a*-2)), the value of the current ratio linearly decreases with a rise of the ambient temperature (current reduction control area (current control area) 308 in FIG. 3(*a*-2)).

As a result, in the current reduction control area 308 where she ambient temperature is between 40 and 50 degrees, for example, the temperature detection value by the LD thermistor is almost constant as illustrated in FIG. 3(*a*-1). It is therefore estimated that the temperature rise of the temperature observation component II also stops as illustrated in the temperature characteristic 313. In contrast, the temperature of the temperature observation component I rises with the ambient temperature as illustrated in the temperature characteristic 312, regardless of the current control in the current reduction control area 308 where the environmental temperature is between 40° C. and. 50° C., for example.

When the current ratio decreases to a minimum current ratio 309 illustrated in FIG. 3(*a*-2) (current ratio=60% in the example of FIG. 3(*a*-2)) under the current control with the rise of the ambient temperature, then the current control stops (keeping the current ratio=60%) when the ambient temperature reaches 50 degrees (plot "○" 310 in FIG. 3(*a*-2)), for example. This is because further current control makes the light source dark and the brightness of the projected image also becomes impractical. When the ambient temperature rises further from 50° C., the temperature detection value by the LD thermistor starts to rise again with. the ambient temperature, as illustrated in temperature characteristic 311 in FIG. 3(*a*-1). The temperature of the temperature observation component II also starts to rise again with the ambient temperature, as Illustrated in temperature characteristic 313 in FIG. 3(*a*-1).

Then, when the temperature detection. value by the LD thermistor reaches the warning display temperature 305 with the rise of the ambient. temperature, a specific indicator of the chassis, for example, is lit up for warning (plot "▲" 316 In FIG. 3(*a*-1)) because a further temperature rise of the temperature observation component I is dangerous. This warning display temperature is, for example, 75 degrees as illustrated in the vertical axis temperature of the plot "▲" 316 in FIG. 3(*a*-1). It is estimated that the temperature of the temperature observation component I at this time reaches 95 degrees where error stopping is executed as described later, for example, that is the upper limit temperature minus 5 degrees (simply described as "Component I, upper limit temp. −5° C." in FIG. 3(*b*-1)) 330. The ambient temperature at this time is 55 degrees, for example, that is illustrated as the warning display ambient temperature 331 in FIG. 3(*a*-1). In a normal environment, it is unlikely that the ambient temperature will be 55 degrees or higher. However, when a projector is used in a factory or the like, there may be cases where the ambient temperature reaches such a temperature.

When the ambient temperature rises further and the temperature detection value by the LD thermistor reaches the error stop temperature 306 (plot "●" 314 in FIG. 3(*a*-1)), a specific indicator of the chassis, for example, is lit up for error stopping for a certain period of time, followed by turning off the power of the main body of the projector 100 for error stopping because the temperature observation component I reaches the dangerous temperature. This error stop temperature 306 is, for example, 80 degrees as illustrated in. the vertical axis temperature of the plot. "●" 314 in FIG. 3(*a*-1). It is estimated that the temperature (simply described as "Component I, upper limit temp. in FIG. 3(*a*-1)) 315 of the temperature observation component I at this time reaches 100 degrees, for example, which is the temperature for error stopping. The ambient temperature at this time is 60 degrees, for example, that is illustrated as the error stop ambient temperature 317 in FIG. 3(*a*-1).

The above comparative example has the current reduction control area 308 illustrated in FIG. 3(*a*-2), where the ambient temperature at which current control is implemented is, for example, between 40 and 50 degrees. In this area, as illustrated in FIG. 3(*a*-1), the temperature detection value by the LD thermistor is almost constant, and therefore control for warning display and error stop is not conducted based on the temperature detection value by the LD thermistor. Therefore, in the comparative example, once the current control stops, followed by the ambient temperature reaching 50° C. or higher (plot "○" 310 in FIG. 3(*a*-2)), for example, and after the temperature detection value by the LD thermistor starts to rise again, determination is made whether the temperature detection value by the LD thermistor reaches the warning display temperature 305 or the error stop temperature 306. In this way, the comparative example has the following problem: the warning display and error stop are determined based on the temperature detection value by the LD thermistor. The brightness of the light source therefore needs to be suppressed by current control as a preliminary step so the warning display or error stop, so that the brightness of the light source is suppressed from the stage where the ambient temperature is low, for example, about 40 degrees (at the time of plot "○" 307 in FIG. 3(*a*-1)), and the projected image becomes dark.

Then, the present embodiment is configured so that the warning display and error stop are determined based on the current ratio instead of the temperature detection value by the LD thermistor as described below. This allows the brightness of the light source 100% to be kept in the area of the ambient temperatures that is higher than the conventional techniques. The operation of the present embodiment will be described below referring to the graphs of FIG. 3(*b*-1) and FIG. 3(*b*-2).

In the present embodiment, when it is determined that the temperature detection value based on the thermistor that detects the temperature of the light source unit reaches the current reduction control start temperature (set value), control is performed to reduce the current ratio flowing through the light source unit. When the reduced current ratio falls below a first set ratio, it is determined that some of the internal components other than the light source unit reach their component upper limit temperatures, and a first process is executed. When the current ratio falls below a second set ratio larger than the first set ratio, a second process for warning about the temperature of the internal components other than the light source unit is executed.

First, in this embodiment, the timing at which current control is started is determined by comparing the temperature detection value by the LD thermistor with the current reduction control start temperature 318 (set value), like the comparative example. Note that the current reduction control start temperature 318 is set to a temperature, e.g., 80° C., that is higher than the current reduction control start temperature 304 in the comparative example of FIG. 3(*a*-1), e.g., 70° C.

When the temperature detection value by the LD thermistor reaches the current reduction control start temperature 318 (set value) (for example, component temperature=80 degrees in FIG. 3(*b*-1)) due to the rise in the ambient temperature (plot "○" 319 in FIG. 3(*b*-1)). Then, in FIG. 1, the controller 101 starts current control for the light-source control circuit 109. Specifically, in the graph of FIG. 3(*b*-2), the current control is conducted so that, starting from the ambient temperature at 319 when the temperature detection value by the LD thermistor reaches the current reduction control start temperature 318 (for example, the ambient temperature=50 degrees in FIG. 3(*b*-2)), the value of the current ratio linearly decreases with a rise of the ambient temperature (current reduction. control area 320 in FIG. 3(*b*-2)).

As a result, in the current reduction control area 320 where the ambient temperature is between 50 and 60 degrees, for example, the temperature detection value by the LD thermistor is almost constant as illustrated in FIG. 3(*b*-1). It is therefore estimated that the temperature rise of the temperature observation component II also stops at the highest value of 110 degrees, for example, that is the upper limit temperature of the temperature observation component II (simply described as "Component II upper limit temp. in FIG. 3(*b*-1)) 321 as illustrated in the temperature characteristic 303. In contrast, the temperature of the temperature observation component I rises as illustrated in the temperature characteristic 302 with the rise of the ambient temperature, regardless of the current control in the current reduction control area 320 where the environmental temperature is between 50° C. and 60° C., for example.

In the present embodiment, the controller 101 determines the timing of warning display and error stop based on the current ratio instead of the temperature detection value by the ID thermistor. The determination is made by comparing with 80%, which is a warning display current ratio 322 (second set ratio) in FIG. 3(*b*-2), or with 60%, which is an error stop current ratio 323 (first set ratio), for example. In other words, these timings can be determined by comparing the current value before starting the current reduction control with the current value determined based on the current ratio.

That is, when the value of the current ratio reaches (fails below) the warning display current ratio 322 as the ambient temperature rises, a specific indicator of the key indicator 113 of FIG. 1 is lit up for warning (plot "▲" 324 in FIG. 3(*b*-2)) because a further temperature rise of the temperature observation component I is dangerous. This warning display current ratio is, for example, 80% as illustrated in the vertical axis ratio of the plot "▲" 324 in FIG. 3(*b*-2). It is estimated that the temperature of the temperature observation component I at this time reaches 95 degrees, for example, that is the upper limit temperature minus 5 degrees (simply described as "Component I, upper limit temp. −5° C." in FIG. 3(*b*-1)) 330 similarly to the comparative example. The ambient temperature at this time is 55 degrees, for example, that is illustrated as the warning display ambient temperature 325 in FIG. 3(*b*-2). This is also the same as in the comparative example.

While the current ratio when the warning is displayed reaches the minimum current ratio 309 of 60% in the comparative example, the current ratio in the present embodiment is 80%. This means that the light source is brighter in this embodiment than in the comparative example when they operate under high ambient. temperatures (e.g., 55° C.). This is an advantage of this embodiment.

When the ambient temperature rises further and the current ratio reaches the error stop current ratio 323 (plot "●" 326 in FIG. 3(*b*-2)), a specific indicator of the key indicator 113 of FIG. 1 is lit up for error stopping for a certain period of time, for example, followed by turning off the power of the main body of the projector 100 in FIG. 1 for error stopping because the temperature observation component I reaches the dangerous temperature. This error stop current ratio 323 is, for example, 60% as illustrated in the vertical axis ratio of the plot "●" 326 in FIG. 3(*b*-2). It is estimated that the temperature (simply described as "Component I, upper limit temp. in FIG. 3(*b*-1)) 315 of the temperature observation component I at this time reaches 100 degrees, for example, which is the upper limit temperature for error stopping. The ambient temperature at this time is 60 degrees, for example, that is illustrated as the error stop ambient temperature 327 in FIG. 3 (*b*-2) similarly to the comparative example.

As is understood from a comparison of this embodiment in FIG. 3 (*b*-2) with the comparative example in FIG. 3(*a*-2), the comparative example starts to suppress the brightness of the light source when the ambient temperature reaches, for example, 40 degrees (plot "○" 307 in FIG. 3(*a*-1)), and the present embodiment keeps the brightness of the light source at 100% until the ambient temperature reaches, for example, 50 degrees (plot "○" 319 in FIG. 3(*b*-1)). That is, this embodiment keeps the operation of the projector 100 safe and bright at higher environmental temperatures than conventional techniques.

Figure 4:
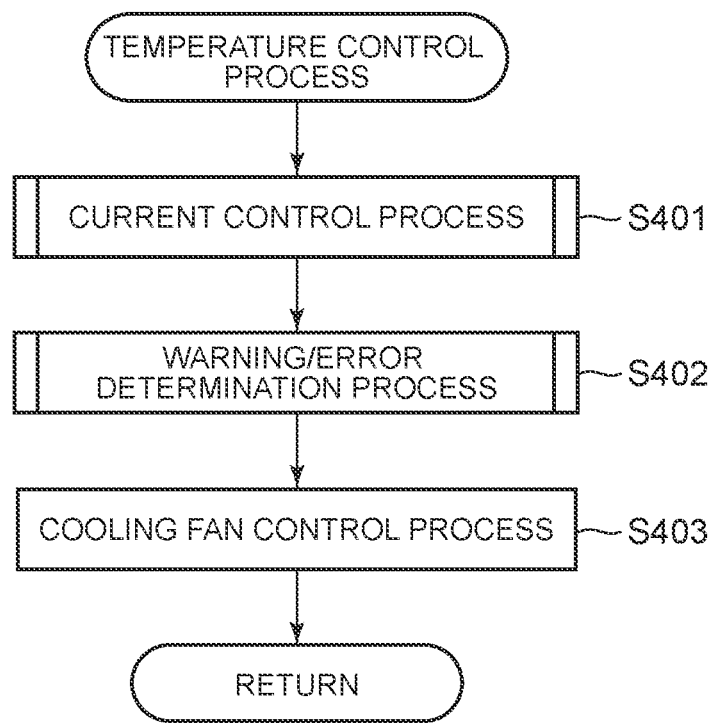
FIG. 4 is a flowchart illustrating a specific example of a temperature control process.

FIG. 4 is a flowchart illustrating a detailed example of the temperature control process of step S208 in the main processing of FIG. 2 described above. This process is executed by the controller 101 of FIG. 1 to implement the operation of this embodiment described referring to FIG. 3(*b*-1) and FIG. 3(*b*-2).

First, the controller 101 of FIG. 1 executes a current control process (step S401). The details of this process are described later.

Next, the controller 101 executes a warning/error determination process (step S402). The details of this Process also are described later.

After that, the controller 101 executes a cooling fan control process (step S403). Controlling the cooling fan also leads to the temperature control of the projector 100.

Figure 5:
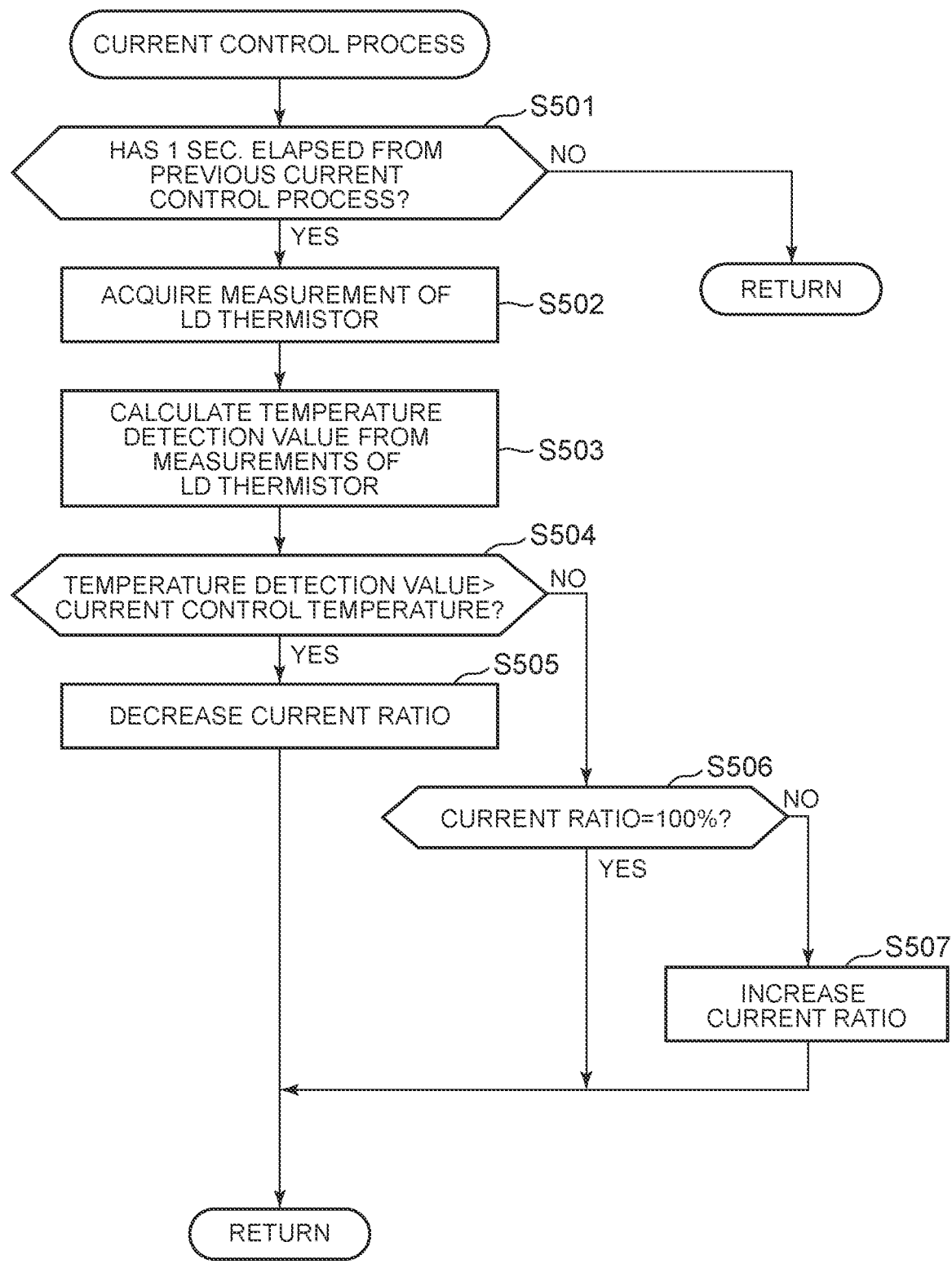
FIG. 5 is a flowchart illustrating a specific example of a current control process.

FIG. 5 illustrates a detailed example of the current control process in step S401 of FIG. 4. First, the controller 101 determines with a timer, not illustrated, whether or not one second has elapsed from the previous current control process in the iterative process of the main processing of FIG. 2 (step S501). The current control process is desirably executed every fixed period of time, e.g., one second. Therefore, if the determination in step S501 is NO, the controller 101 returns the procedure directly to the calling program, and ends the current control process in step S401 of FIG. 4 that is illustrated in the flowchart of FIG. 5.

When one second elapses from the previous current control process and the determination in step S501 is YES, the controller 101 acquires the measurement of the LD thermistor (step S502). Then, the controller 101 calculates a temperature detection value from the measurement of the LD thermistor acquired in step S502 (step S503). The LD thermistor may be placed near the light source unit 110 of the laser diode. Instead of a single LD thermistor, a plurality of LD thermistors may be placed at a plurality of positions. When a single LD thermistor is used, the controller 101 uses the measurement of the LD thermistor as it is as the temperature detection value. When a plurality of LD thermistors is used, the controller 101 uses the maximum value of the measurements of these LD thermistors as the temperature detection value. Or the controller 101 may calculate the average of the measurements of these LD thermistors as the temperature detection value.

After that, the controller 101 determines whether or not the temperature detection value calculated in step S503 exceeds the current reduction control start temperature (for example, 80 degrees) illustrated in FIG. 3(*b*-1) (in other words, whether or not it reaches the temperature) (step S504). In this example, the terms "exceed" and "reach" can be read interchangeably.

When the temperature detection value exceeds the current reduction control start temperature (the determination in step S504 is YES), the controller 101 starts the current control to decrease the current ratio (step S505). After that, the controller 101 ends the current control process of step S401 of FIG. 4 illustrated in the flowchart of FIG. 5.

When the temperature detection value does not exceed the current reduction control start temperature (set value) (the determination in step S504 is NO), the controller 101 determines whether or not the current ratio at present is 100% (step S506).

The current ratio of 100% means that the current reduction control does not start. In that case (the determination in step S506 is YES), the controller 101 returns without doing anything, and ends the current control process in step S401 in FIG. 4 illustrated in the flowchart of FIG. 5.

If the current ratio is not 100%, this means that the current reduction control has already started. When the current reduction control is started and the temperature detection value is equal to or less than the threshold (set value) of the current reduction control start temperature (when the determination in step S506 is NO), the controller 101 determines that the temperature has decreased sufficiently and increases the current ratio again (increase the current) (step S507). After that, the controller 101 returns and ends the current control process of step S401 of FIG. 4 illustrated in the flowchart of FIG. 5.

Figure 6:
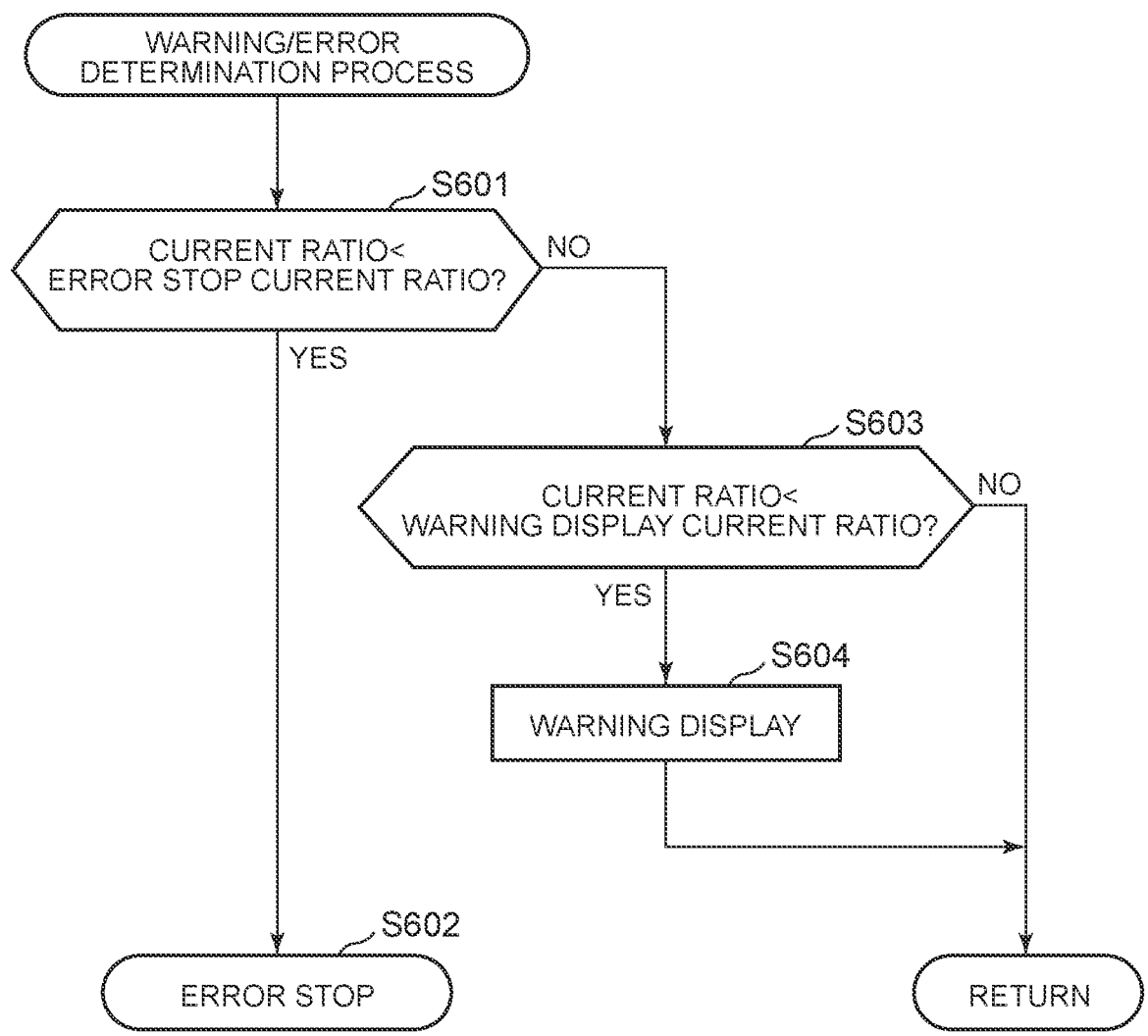
FIG. 6 is a flowchart illustrating a specific example of a warning/error determination process.

FIG. 6 is a flowchart illustrating a detailed example of the warning/error determination process in step S402 of FIG. 4. First, the controller 101 determines whether the current ratio at present fails below (or in other words, reaches) the error stop current ratio (first set ratio) (see FIG. 3(*b*-2)) (step S601). In this example, the terms "fall below" and "reach" can be read interchangeably.

When the current ratio at present falls below the error stop current ratio (the determination in step S601 is YES), the controller 101 executes an error stop process (first process) (step S602). In this process, the controller 101 lights up the lamp of the key/indicator 113, for example, indicating an error state for a certain period of time (e.g., about 10 seconds), and then turns off the power of the main body of the projector 100. In this case, the controller 101 may cause the cooling fan drive control circuit 118 to rotate the cooling fan for a certain period of time to cool the main body, and then turn the power off.

When the current ratio at present does not fall below the error stop current ratio (first set ratio) (the determination in step S601 is NO), the controller 101 determines whether or not the current ratio at present falls below the warning display current ratio (second set ratio) (see FIG. 3(*b*-2)) (step S603).

When the current ratio at present falls below the warning display current ratio (second set ratio) (the determination in step S603 is YES), the controller 101 executes a warn display process (second process) (step S604). In this process, the controller 101 controls the key/indicator 113 to light up a lamp for warning display, for example. After that, the controller 101 ends the warning/error determination process in step S402 of FIG. 4 illustrated in the flowchart of FIG. 6.

When the current ratio at present does not fall below the warning display current ratio (the determination in step S603 is NO), the controller 101 does not have to conduct warning display or error stop. The controller 101 therefore returns and ends the warning/error determination process in step S402 of FIG. 4 illustrated in the flowchart of FIG. 6.

As described above, the present embodiment is configured to conduct warning display and error stop based on the current ratio and not the temperature detection value. This allows warning display and error stop to be conducted in an area having a constant temperature detection value by the LD thermistor (the temperature characteristic 301 with the current reduction control area having higher ambient temperatures in FIG. 3(*b*-1) between 50 to 60 degrees, for example). This shifts the ambient temperature for starting the current control to higher temperatures than conventional techniques, and thus keeps the brightness of the light source at 100% up to higher ambient temperatures.

In the present embodiment, as illustrated in FIG. 3, the controller 101 compares the current ratio of the current flowing through the light source unit 110 before the temperature detection value detected by the temperature sensor exceeds a set value to the reduced current flowing through the light source unit 110 under the current control with the warning display current ratio 322 (second set ratio) in FIG. 3(*b*-2), e.g., 80% or the error stop current ratio 323 (first set ratio), e.g., 60%, thus determining the timings of the warn display and error stop. Alternatively, the controller 101 may compare the reduced current flowing through the light source unit 110 under the current control with the current (second threshold) corresponding to the warn display or the current (first threshold) corresponding to the error stop, thus determining the timing of the warn display and the error stop.

As a specific example, assume the case where in a normal environment, the current flowing through the light source unit 110 is set to 3000 milliamperes (mA). Then, the second threshold of the current when the temperature warning is displayed may be set at 2100 mA and the first threshold of the current when the operation stops due to a temperature error may be set at 1800 mA. Then, the warning display and error stop may be implemented in response to a determination that the reduced current flowing through the light source unit 110 under the current control has reached (fallen below) these second and first thresholds.

In this case, assuming that the current 3000 mA in the normal environment is 100%, the current of 2100 mA of the second threshold corresponding to the warning display is the current ratio of 70%, and the current of 1800 mA of the first threshold corresponding to the error stop is the current ratio of 60%.

In another example, assume the case where in a normal environment, the current flowing through the light source unit 110 is set to 3000 mA, which is the same as in the above example. Then the second threshold of the current when the temperature warning is displayed may be set to 1900 mA, and the first threshold of the current when the operation stops due to a temperature error may be set to 1700 mA. Then, the warning display and error stop may be implemented in response to a determination that the reduced current flowing through the light source unit 110 under the current. control has reached (fallen below) these second and first thresholds.

In this case, relative to the current 3000 mA (100%) in the normal environment, the current of 1900 mA of the second threshold corresponding to the warning display is the current ratio of about 63%, and the current of 1700 mA of the first threshold corresponding to the error stop is the current ratio of about 56%.

The present invention is not limited to the above embodiment, and may be modified variously for implementation without departing from the scope of the invention. The functions implemented in the embodiment described above may be combined as appropriate as possible. The above-mentioned embodiment includes various stages, and various aspects of the invention may be extracted by appropriate combinations of the disclosed multiple elements. For example, some elements may be deleted from the constituent elements disclosed in the embodiments. Such a configuration after deletion also can be extracted as the invention as long as it has the advantageous effects as mentioned above.

What is claimed is:

1. A projector comprising:
   at least one processor; and
   a memory, the at least one processor being configured to execute processes in accordance with a program stored in the memory, and the processes comprising:
      in response to a temperature detection value acquired from at least one temperature detection sensor that detects a temperature of a light source unit reaching a set value, controlling to reduce a current flowing through the light source unit; and
      in response to a current ratio of a current flowing through the light source unit with respect to a timing before a start of the controlling to reduce the current reaching a first set ratio, or in response to a reduced current value reaching a first threshold, executing a first process.

2. The projector according to claim 1, wherein the first process includes stopping of operation of the projector.

3. The projector according to claim 2, wherein the at least one processor is configured to, in response to the current ratio reaching a second set ratio larger than the first set ratio or in response to the reduced current value reaching a second threshold larger than the first threshold, execute a second process of temperature warning.

4. The projector according to claim 1, wherein:
   the at least one temperature detection sensor includes a thermistor configured to detect a temperature near a light source of a laser diode, and
   the processor is configured to execute the first process in response to the first set ratio or the first threshold being reached, based on a determination that some internal components other than the light source unit have reached their component upper-limit temperatures.

5. The projector according to claim 1, wherein:
   the at least one temperature detection sensor includes a plurality of temperature detection sensors, and
   the processor is configured to acquire a maximum value from among a plurality of outputs from the plurality of temperature detection sensors as the temperature detection value.

6. The projector according to claim 1, wherein:
   the at least one temperature detection sensor includes a plurality of temperature detection sensors, and
   the processor is configured to acquire an average of a plurality of outputs from the plurality of temperature detection sensors as the temperature detection value.

7. A temperature control method executed by at least one processor of a projector, the temperature control method comprising:
   in response to a temperature detection value acquired from at least one temperature detection sensor that detects a temperature of a light source unit reaching a set value, controlling to reduce a current flowing through the light source unit; and
   in response to a current ratio of a current flowing through the light source unit with respect to a timing before a start of the controlling to reduce the current reaching a first set ratio, or in response to a reduced current value reaching a first threshold, executing a first process.

8. The temperature control method according to claim 7, wherein the first process includes stopping of operation of the projector.

9. The temperature control method according to claim 8, further comprising, in response to the current ratio reaching a second set ratio larger than the first set ratio or in response to the reduced current value reaching a second threshold larger than the first threshold, executing a second process of temperature warning.

10. The temperature control method according to claim 7, wherein:
the at least one temperature detection sensor includes a thermistor configured to detect a temperature near a light source of a laser diode, and
the first process is executed in response to the first set ratio or the first threshold being reached, based on a determination that some internal components other than the light source unit have reached their component upper-limit temperatures.

11. The temperature control method according to claim 7, wherein:
at least one temperature detection sensor includes a plurality of temperature detection sensors, and
a maximum value from among a plurality of outputs from the plurality of temperature detection sensors is acquired as the temperature detection value.

12. The temperature control method according to claim 7, wherein:
the at least one temperature detection sensor includes a plurality of temperature detection sensors, and
an average of a plurality of outputs from the plurality of temperature detection sensors is acquired as the temperature detection value.

13. A non-transitory computer-readable recording medium having a program stored thereon, the program being executable to control a computer of a projector to execute processes comprising:
in response to a temperature detection value acquired from at least one temperature detection sensor that detects a temperature of a light source unit reaching a set value, controlling to reduce a current flowing through the light source unit; and
in response to a current ratio of a current flowing through the light source unit with respect to a timing before a start of the controlling to reduce the current reaching a first set ratio, or in response to a reduced current value reaching a first threshold, executing a first process.

\* \* \* \* \*

UNITED STATES PATENT AND TRADEMARK OFFICE
CERTIFICATE OF CORRECTION

PATENT NO. : 12,197,114 B2
APPLICATION NO. : 17/518460
DATED : January 14, 2025
INVENTOR(S) : Tomoyuki Ueda and Tetsuro Narikawa Page 1 of 1

It is certified that error appears in the above-identified patent and that said Letters Patent is hereby corrected as shown below:

In the Claims

Column 13, Line 17 (Claim 11, Line 3), before "at" insert --the--.

Signed and Sealed this
Fourth Day of March, 2025

Coke Morgan Stewart
*Acting Director of the United States Patent and Trademark Office*